United States Patent [19]

Kato et al.

[11] Patent Number: 5,327,937
[45] Date of Patent: Jul. 12, 1994

[54] BRANCHED VALVE

[75] Inventors: Shigenobu Kato, Yorii; Yasuo Yamabe, Kawagoe, both of Japan

[73] Assignee: Sekisui Kagaku Kogyo Kabushiki Kaisha, Osaka, Japan

[21] Appl. No.: 1,729

[22] Filed: Jan. 6, 1993

[51] Int. Cl.⁵ ............................................. F16K 7/14
[52] U.S. Cl. ................................. 137/863; 251/331
[58] Field of Search ............... 251/331; 137/863, 861

[56] References Cited

U.S. PATENT DOCUMENTS

| | | | |
|---|---|---|---|
| 2,695,156 | 11/1954 | Ivanek | 251/264 |
| 2,989,282 | 6/1961 | White | 251/61 |
| 4,653,526 | 3/1987 | Hoiss | 251/331 |
| 4,977,929 | 12/1990 | Chinnock et al. | 251/331 X |
| 5,065,980 | 11/1991 | Pederson | 251/331 X |
| 5,222,523 | 6/1993 | Trimble | 137/863 |

FOREIGN PATENT DOCUMENTS 62-151676  6/1987  Japan .
WO/9100460  1/1991  World Int. Prop. O. .
WO/9200476  1/1992  World Int. Prop. O. .

*Primary Examiner*—John Rivell
*Attorney, Agent, or Firm*—Ronald R. Snider

[57] ABSTRACT

A branched valve includes a main flow passage and a branch flow passage provided in a main body, a weir provided between the main and branch flow passages, and a valve disc which can contact with and come off from the weir and which selectively connects and disconnects the main and branch flow passages, wherein a branch flow entrance wall of the branch flow passage integrated with the weir has either a flat surface or a convex surface. The outer wall of the branch flow exit of the main flow passage may rise vertically from the outer wall of the main flow passage, and the side wall of the weir is located approximately on the center line of the main flow passage. The branch flow passage may be provided so that the center line thereof is located higher than the center line of the main flow passage. The valve disc may be a diaphragm.

2 Claims, 3 Drawing Sheets

BRANCHED VALVE

FIELD OF THE INVENTION

This invention relates to a branched valve, and in particular to a branched valve used for the branching point in pipe lines for transferring pure water or super pure water used in a fabricating process of a semiconductor device such as ICs, LSIs, or super LSIs, germ-free water used in a pharmaceutical process, or food relating fluid.

BACKGROUND OF THE INVENTION

A conventional branched valve has been described in Japanese Patent Provisional Publication (Tokkaisho) No. 151676/87. The branched valve 1 includes a main body 2 provided with a main flow passage 3 and a branch flow passage 4, a weir 5 provided between a branch flow exit 3A of the main flow passage 3 and a branch flow entrance 4A of the branch flow passage 4, and a diaphragm 6 (valve disc) which selectively connects and disconnects the main flow passage 3 and the branch flow passage 4. A branch flow entrance wall 4B of the branch flow entrance 4A which is integrated with the weir 5 has a recessed surface.

However, the conventional branched valve 1 has a disadvantage in that the flux of the branch flow is not sufficient. In the conventional branched valve 1, the branch flow of the fluid which flows into the branch flow passage 4 from the main flow passage 3 is easily peeled off from the branch flow entrance wall 4B just after getting over the weir 5, and makes a turbulent flow. The turbulent flow causes the pressure loss which then causes a large amount of the flux loss.

Further, the conventional branched valve 1 has another disadvantage in that the size is not compact, though the branched valve 1 which is to be connected within i.e. a circulation system of super pure water is desired to has a compact size with sufficient flux of the branch flow. In the conventional branched valve 1, the outer wall of the main flow passage 3 projects largely from the valve center (handle center) to make the width W of the branched valve 1 large, and the lower part of a socket of the branch flow passage 4 projects downward to make the height L of the branched valve 1 large.

SUMMARY OF THE INVENTION

Accordingly, it is an object of this invention to provide a branched valve in which generation of the turbulent flow is prevented and sufficient flux of the branch flow is obtained.

It is another object of this invention to provide a branched valve having a compact size with sufficient flux of the branch flow.

According to an aspect of the invention, a branched valve includes a main flow passage and a branch flow passage provided in a main body, a weir provided between the main flow passage and the branch flow passage, and a valve disc which can contact with and come off from the weir and which selectively connects and disconnects the main and branch flow passages, wherein a branch flow entrance wall of the branch flow passage which is integrated with the weir has either a flat surface or a convex surface. The valve disc may be a diaphragm.

In this branched valve, after getting over the weir, a fluid which flows into the branch flow passage from the main flow passage flows down along the branch flow entrance wall which has either the flat or convex surface, without being peeled off from the branch flow entrance wall. Therefore, a turbulent flow is not generated, and the pressure loss and the resulting flux loss are prevented. Accordingly, sufficient flux of the branch flow is obtained.

According to another aspect of the invention, a branched valve includes a main flow passage and a branch flow passage provided in a main body, a weir provided between the main flow passage and the branch flow passage, and a valve disc which can contact with and come off from the weir and which selectively connects and disconnects the main and branch flow passages, wherein an outer wall of a branch flow exit of the main flow passage rises vertically from the outer wall of the main flow passage, and a side wall of the weir is located approximately on the center line of the main flow passage. The branch flow passage may be provided so that the center line thereof is located higher than the center line of the main flow passage. The valve disc may be a diaphragm.

In this branched valve, the outer wall of the branch flow exit rises vertically from the outer wall of the main flow passage, so that the outer wall of the main flow passage does not project outerward from the center of the branched valve (handle center) and the width W of the branched valve becomes small. The side wall of the weir, which determines the flow area of the branch flow passage, is located approximately on the center line of the main flow passage and overhangs the main flow passage in more degrees as compared with the conventional branched valve. However, the outer wall of the branch flow exit rises vertically from the outer wall of the main flow passage and does not overhang the main flow passage, so that the prescribed flow area of the branch flow does not decrease, and sufficient flux of the branch flow can be obtained. Further, the branch flow passage is provided so that the center line thereof is located higher than the center line of the main flow passage, so that the lower part of a socket of the branch flow passage does not project downward from the main body of the branched valve and the height L of the branched valve becomes small.

BRIEF DESCRIPTION OF THE DRAWINGS

This invention will be explained in more detail in conjunction with appended drawings, wherein:

FIG. 1 is a cross-sectional view showing the conventional branched valve.

DESCRIPTION OF THE PREFERRED EMBODIMENT

Figure 2:
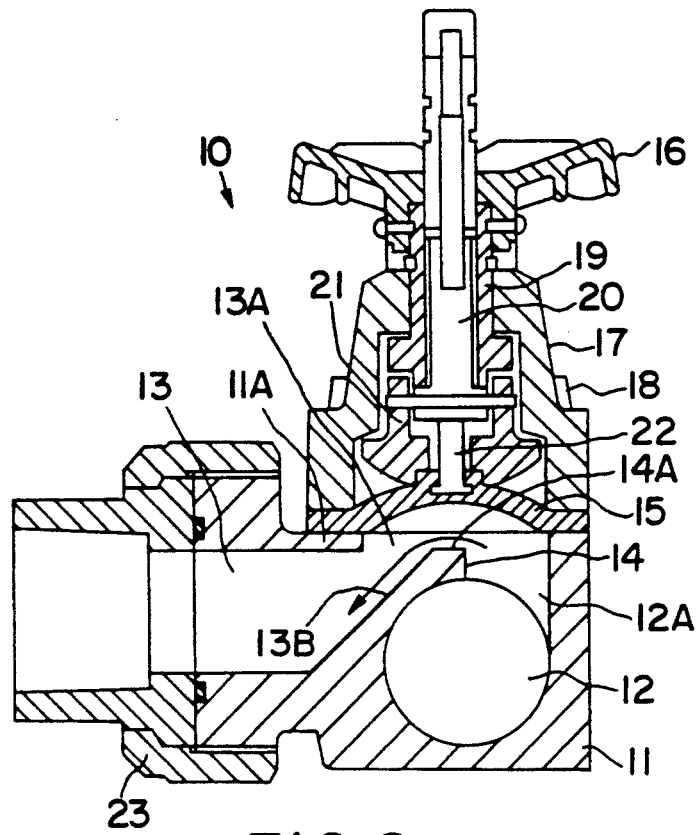
FIG. 2 is a cross-sectional view showing a branched valve in a first embodiment according to the invention.

First, the branched valve in the first embodiment will be described in conjunction with FIG. 2. The branched valve 10 has a main flow passage 12 and a branch flow passage 13 in a main body 11, a weir 14 provided between a branch flow exit 12A of the main flow passage 12 and a branch flow entrance 13A of the branch flow passage 13, and a diaphragm (valve disc) 15 which can contact with and come off from a top surface (valve seat) 14A of the weir 14 and which selectively connects and disconnects the main flow passage 12 and the branch flow passage 13.

The main body 11 which may consist of synthetic resin such as vinyl chloride resin, polyphenylenesulfide, polyvinylidenefluoride or polybutene, for example, is molded integrated with the main flow passage 12 and the branch flow passage 13. The branch flow passage 13 is branched in the direction of about a right angle with the main flow passage 12. A periphery 11A of the main body 11 is for supporting the periphery of the diaphragm 15.

The diaphragm 15 which may consist of an elastic material of synthetic resin, for example, can contact with pressure and come off from the valve seat 14A of the weir 14 by rotating a handle 16, and the branch flow which flows into the branch flow passage 13 from the main flow passage 12 is controlled. A bonnet 17 is fixed on the periphery 11A of the main body 11 by a bolt 18 so as to surround the diaphragm 15. A sleeve 19 is supported within the bonnet 17 so as to be allowed to rotate. The handle 16 is fixed on the part of the sleeve 19 out of the bonnet 17. A stem 20 is engaged with the sleeve 19 by screw threads, and the stem 20 can move up and down without rotating by rotating the handle 16 and the sleeve 19. A compressor 21 is connected with an inner part of the stem 20. The center part of the diaphragm 15 is connected with the compressor 21 by a pressing metal 22. The diaphragm 15 can contact with or come off from the valve seat 14A of the weir 14 by stem 20 which moves up and down by rotating the handle 16. A union socket 23 is connected to the branch flow passage 13. A branch flow entrance wall 13B which is integrated with the weir 14 in the branch flow passage 13 has a flat surface.

This branched valve 10 may be connected at the main flow passage 12 to an impurity reducing apparatus, a sterilization apparatus, or a circulation system for super pure water processed by a filter and osmotic membrane apparatus, and at the branch flow passage 13 to the use point of either apparatus or system.

In this branched valve 10, the sleeve 19 rotates by rotating the handle 16. As a result, the stem 20 which is engaged with the sleeve 19 by screw threads moves down without rotating, and the diaphragm 15 contacts with the valve seat 14A of the weir 14 with pressure, so that the branch flow is shut off. On the other hand, the branch flow can flow and be controlled in the flux by rotating the handle 16 in the counterwise direction.

In this embodiment, the branch flow which flows into the branch flow passage 13 from the main flow passage 12 after getting over the weir 14 flows down along the branch flow entrance wall 13B which has the flat surface without being peeled off from the wall 13B, so that a turbulent flow is not generated. Therefore, the pressure loss due to generation of the turbulent flow and the resulting flux loss is prevented. Accordingly, sufficient flux of the branch flow is obtained.

Figure 3:
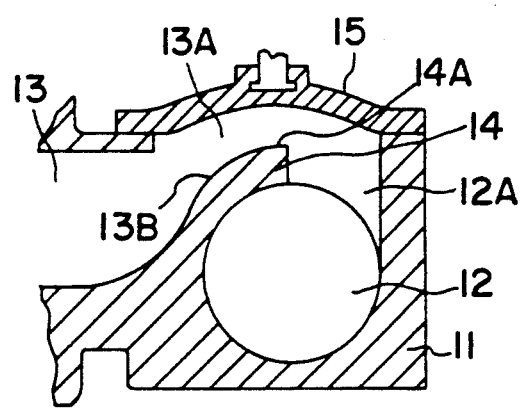
FIG. 3 is a cross-sectional view showing a branched valve in a second embodiment according to the invention.
Figure 4:
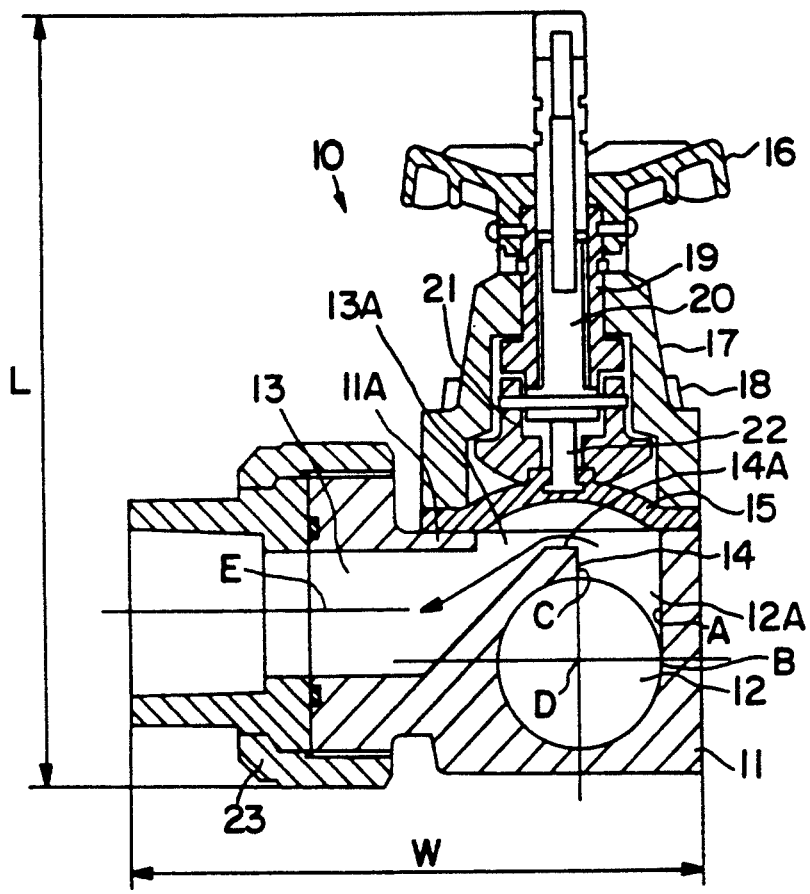

Next, the branched valve in the second embodiment will be described in conjunction with FIG. 3. The basic structure of the branched valve 10 in this embodiment is the same as that in the first embodiment, except that the branch flow entrance wall 13B has a convex surface. In this embodiment, the branch flow which flows into the branch flow passage 13 from the main flow passage 12 after getting over the weir 14 flows down along the branch flow entrance wall 13B without peeling off from the wall 13B, and the same effects can be obtained as those in the first embodiment.

Figure 4:
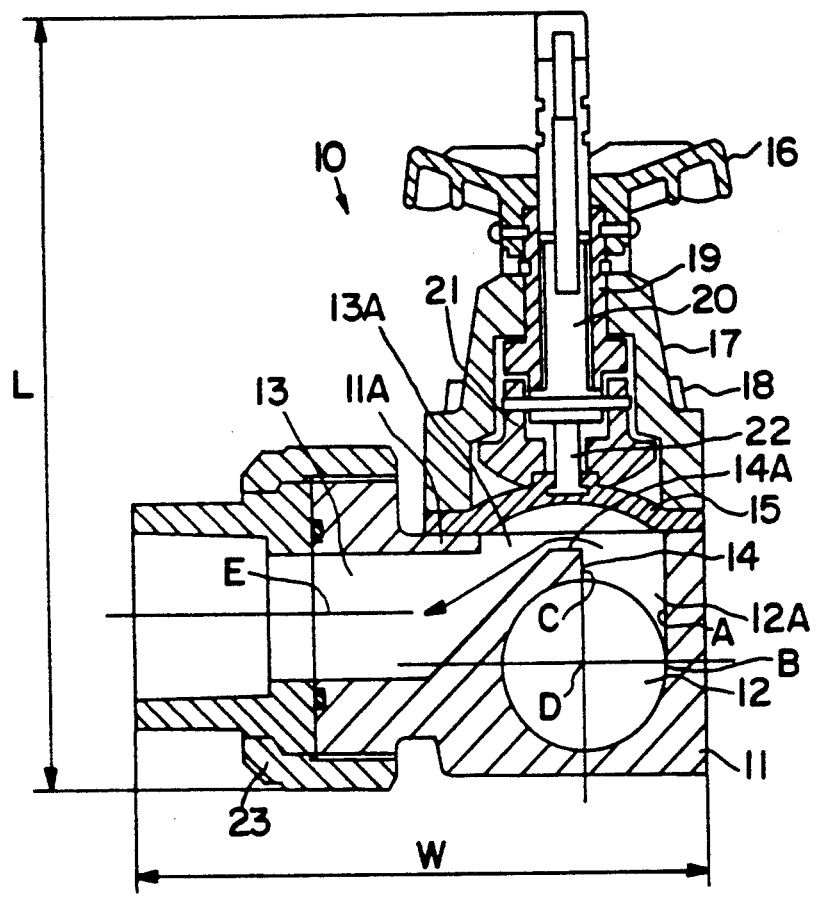
FIG. 4 is a cross-sectional view showing a branched valve in a third embodiment according to the invention.

Next, the branched valve in the third embodiment will be described in conjunction with FIG. 4. The basic structure of the branched valve 10 in this embodiment is the same as that in the first embodiment, except that the an outer wall A of the branch flow exit 12A rises vertically from an outer wall B of the main flow passage 12, a side wall C of the weir 14 is located approximately on the center line D of the main flow passage 12, and the branch flow passage 13 is provided so that the center line E thereof is located higher than the center line D of the main flow passage 12.

In this embodiment, the outer wall A of the branch flow exit 12A rises vertically from the outer wall B of the main flow passage 12, so that the outer wall A of the main flow passage 12 does not project outward largely from the center of the branched valve 10 (handle center) and the width W of the branched valve 10 becomes small. The side wall C of the weir 14 is located approximately on the center line D of the main flow passage 12 and overhangs the main flow passage 12 in more degrees. However, the outer wall A of the branch flow exit 12A rises vertically from the outer wall B of the main flow passage 12 and does not overhang the main flow passage 12, so that the prescribed flow area of the branch flow does not decrease, and sufficient flux of the branch flow can be obtained. Further, the branch flow passage 13 is provided so that the center line E thereof is located higher than the center line D of the main flow passage 12, so that the lower part of the union socket 23 of the branch flow passage 13 does not project downward from the main body 11 of the branched valve 10 and the height L of the branched valve 10 becomes small.

In this invention, the main body of the branched valve may consist of corrosion resisting metal such as stainless steel or ceramics, instead of synthetic resin mentioned in the embodiments. The system for shutting off the branch flow may be any other shutting off mechanism known publicly such as a stop valve or a gate valve with design modification of the valve disc and the valve seat of the weir, instead of the diaphragm described in the embodiments. Further, the union sockets to be connected to the main and branch flow passages may be either the screw-type, flange-type or taper-sleeve type. Additionally, the invention may be applied for an automatic operating valve provided with an actuator for automatic operation, instead of the manual operating valve described in the embodiments.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A branched valve, comprising:
   a main flow passage and a branch flow passage provided in a main body;
   a weir provided between said main flow passage and said branch flow passage;
   a valve disc which can contact with and come off from said weir and which selectively connects and disconnects said main flow passage and said branch flow passage; and wherein an outer wall of a branch flow exit of said main flow passage rises vertically from an outer wall of said main flow passage, and a side wall of said weir is located on the center line of said main flow passage.

2. A branched valve, comprising:
- a main flow passage and a branch flow passage provided in a main body;
- a weir provided between said main flow passage and said branch flow passage;
- a valve disc which can contact with and come off from said weir and which selectively connects and disconnects said main flow passage and said branch flow passage;
- wherein an outer wall of a branch flow exit of said main flow passage rises vertically from an outer wall of said main flow passage, and a side wall of said weir is located approximately on the center line of said main flow passage; and
- wherein said branch flow passage is provided so that the center line thereof is located above the center line of said main flow passage.

* * * * *